United States Patent [19]

Amburn et al.

[11] Patent Number: 5,675,618
[45] Date of Patent: Oct. 7, 1997

[54] MECHANICAL PLUG FOR VESSEL PENETRATION AND METHOD THEREFOR

[75] Inventors: James A. Amburn, Fort Oglethorpe, Ga.; Douglas S. Porter, Simsbury, Conn.; Krishnamurthi M. Rajan, Chattanooga, Tenn.

[73] Assignee: Combustion Engineering Inc., Conn.

[21] Appl. No.: 546,475

[22] Filed: Oct. 20, 1995

[51] Int. Cl.⁶ .................................................. G21C 13/067
[52] U.S. Cl. ...................... 376/203; 376/260; 376/463; 138/89; 165/76
[58] Field of Search .................................. 376/203–206, 376/260, 463; 165/76; 138/89, 91; 29/402.07, 890.031, 890.036

[56] References Cited

U.S. PATENT DOCUMENTS

| | | | |
|---|---|---|---|
| 3,353,566 | 11/1967 | Cepkauskas et al. | 376/203 |
| 4,114,654 | 9/1978 | Richardson | 138/89 |
| 4,195,869 | 4/1980 | Klahn et al. | 292/256.67 |
| 4,255,840 | 3/1981 | Loch et al. | 29/890.031 |
| 4,646,816 | 3/1987 | Rothstein | 165/76 |
| 4,986,313 | 1/1991 | Mounet | 138/89 |
| 5,091,140 | 2/1992 | Dixon et al. | 376/260 |
| 5,094,801 | 3/1992 | Dixon et al. | 376/307 |
| 5,135,705 | 8/1992 | Gooch, IV et al. | 376/203 |
| 5,297,187 | 3/1994 | Sodergren et al. | 376/203 |
| 5,323,428 | 6/1994 | Porter et al. | 376/204 |
| 5,513,227 | 4/1996 | Margotta et al. | 376/203 |

*Primary Examiner*—Michael J. Carone
*Assistant Examiner*—Matthew Lattig
*Attorney, Agent, or Firm*—Ronald P. Kananen

[57] ABSTRACT

In order to plug a pressure vessel penetration through which a heater was disposed, a stepped diameter hollow cylinder is provided with grafoil seals which are set on an annular shoulder defined by the stepped diameters of the cylinder and compressed against a lower annular edge of a sleeve which is partially machined away. The hollow cylinder is locked in position in the sleeve by a plurality of barb-shaped flanges which are formed at the upper ends of a plurality of flexible finger-like segments defined in the upper end of the hollow cylinder, and which engage the upper end of the sleeve. A rod is disposed in the hollow cylinder and welded in position to complete the plug.

11 Claims, 4 Drawing Sheets

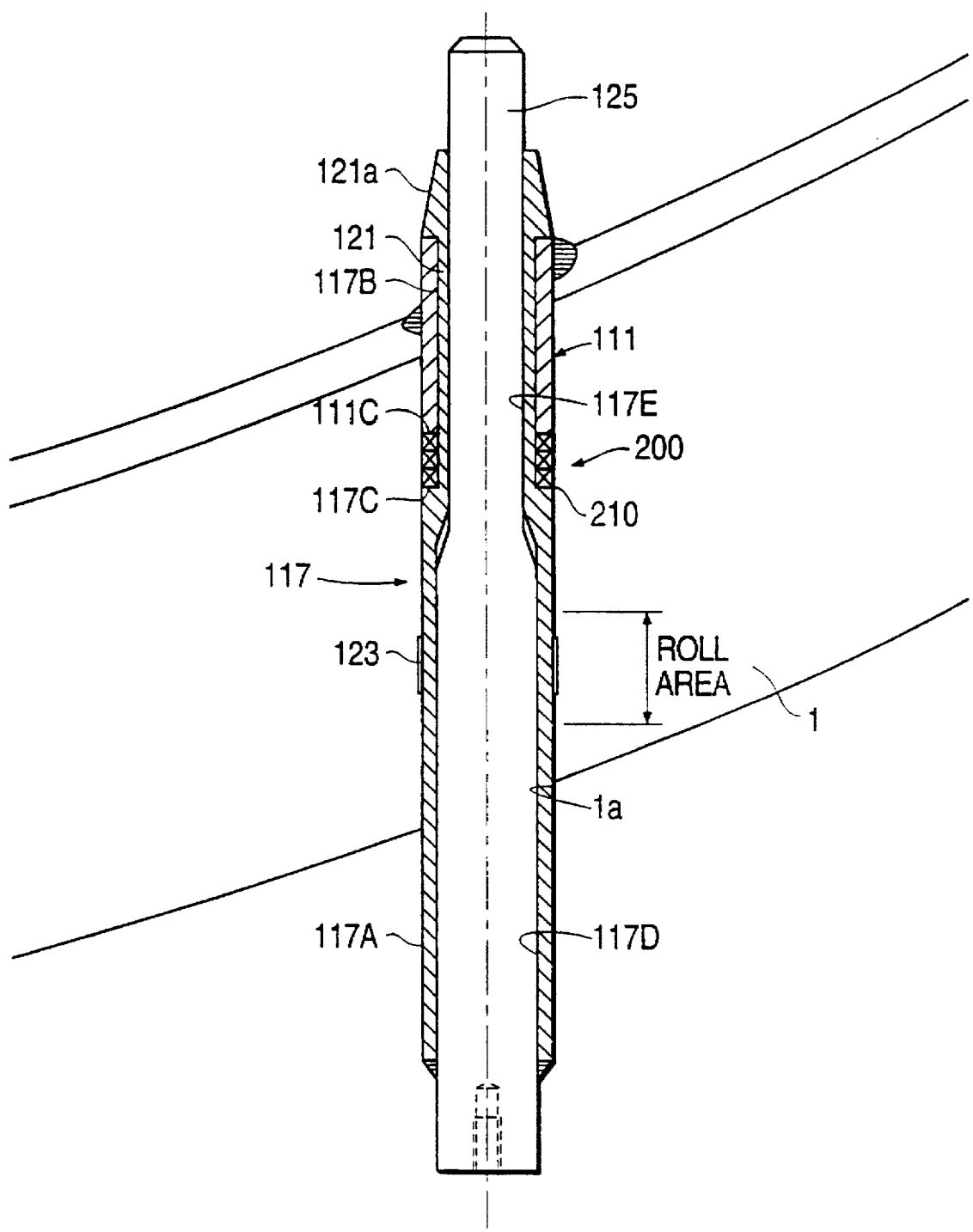

MECHANICAL PLUG FOR VESSEL PENETRATION AND METHOD THEREFOR

CROSS-REFERENCE TO COPENDING APPLICATIONS

Cross-reference is made to copending application entitled RESISTANCE TEMPERATURE DETECTOR NOZZLE MECHANICAL CLAMP filed on Apr. 20, 1995 in the name of D. S Porter and K. E. Coe and assigned U.S. Ser. No. 08/425,552 now U.S. Pat. No. 5,619,546.

BACKGROUND OF THE INVENTION

1. Field of the Invention

The present invention relates generally to a nuclear steam supply system (NSSS). More specifically, the present invention relates to a mechanical plug for sealing a pressurizer penetration utilized in a pressurized boiling water reactor (PWR) without the need for welding at the pressure boundary parts.

2. Description of the Related Art

FIG. 1 shows a pressurized water reactor (PWR) system which includes a reactor vessel 100, two steam generators 102, 103, two pumps 104, 105, and a pressurizer 106. The pressurizer 106, as is well known, is a device in which water is heated by replaceable direct immersion electrical heaters which are disposed through welded penetrations formed in the bottom of pressurizer vessel. The steam pressure produced the pressurizer 106 is used to maintain the reactor coolant system operating pressure in a manner which compensates for the changes in NSSS reactor coolant volume during load changes, heat-up, and cool down. During full power operation, the pressurizer 106 is about ⅓ full of saturated steam.

However, the penetrations through which the heaters are disposed are susceptible to cracking and leakage which results from Primary Water Stress Corrosion Cracking (PWSCC) of the alloy (e.g. "Inconel 600") from which the nozzles are formed. Repair of these types of nozzles involves lengthy welding procedures which increase the amount of work and time required to restore the reactor to a fully operational condition once this type of cracking and deterioration occurs.

Examples of this type of technique are disclosed in U.S. Pat. No. 5,094,801 dated Mar. 10, 1992 by Dixon et al.; U.S. Pat. No. 5,091,140 dated Feb. 25, 1992 by Dixon et al.; and U.S. Pat. No. 4,255,840 dated Mar. 17, 1981 by Lock et al.

U.S. Pat. No. 5,297,187 dated Mar. 22, 1994 to Sodergren et al. discloses an arrangement wherein, as shown in FIG. 2, a pressurizer 106, for a nuclear steam supply system of the type depicted in FIG. 1, includes a carbon steel pressure vessel 1 and has at its upper end a manway 3 and a spray system 5. A surge outlet 7 and a plurality of electric immersion heaters 9 are provided at the lower end of the pressure vessel 1.

The immersion heaters 9 are, as shown in FIGS. 3 to 5, supported within tubular nickel alloy heater sleeves 11 which penetrate the pressure vessel 1, and are disposed in the sleeves 11 in a manner which provides a hermetic seal. An annular bushing 13 is welded to the outside of each heater sleeve 11 and is threadedly engaged with a locking collar 15 which retains the associated heater 9 against a blow out or ejection by the pressure prevailing within the pressurizer 10.

As shown in FIG. 4, the sealing device includes a hollow carbon steel cylinder 17. This hollow cylinder 17 has an external diameter essentially equal to the internal diameter of the heater sleeves 11 and a length which is greater than the sleeves. A tapered nose portion 17a of cylinder 17 is divided, by axially extending slots 19, into a number of elongate finger-like segments 21, each of which includes a barb-shaped outwardly extending flange 21a proximate its distal end. The segments 21 are sufficiently flexible that radially inward displacement of the flanges 21a is possible. An annular band 23 of a soft nickel alloy is formed on the external surface of hollow cylinder 17.

In the event that a leak develops in one of the heaters 9 or heater sleeves 11, the affected heater 9 is removed and replaced with a hollow cylinder 17. It will be appreciated that, as the hollow cylinder 17 is inserted into the heater sleeve 11, engagement between the inner surface of the heater sleeve 11 and tapered nose portion 17a of cylinder 17 results in the radially inward displacement of the segments 21 such that the nose portion 17a is able to pass through the sleeve. When the nose portion 17a emerges from the heater sleeve 11 into the interior of pressure vessel 1, the segments 21 snap back to their unstressed positions whereat the outwardly extending barb-shaped flanges 21a engage the heater sleeve 11 in the manner illustrated in FIG. 3. This engagement securely retains the hollow cylinder 17 within the heater sleeve 11 and prevents ejection by the steam pressure within pressure vessel 1.

With the hollow cylinder 17 in position, a solid, nickel alloy, cylindrical rod 25 is inserted into the interior of the hollow cylinder 17. The rod 25 has a smooth outside diameter (OD) substantially equal to the internal diameter of the hollow cylinder 17 and a length which is greater than the cylinder 17. A chamfered nose portion 25a is provided to facilitate insertion of the rod into the hollow cylinder 17. The rod 25 serves to fill and seal the passage defined in the hollow cylinder 17 and to lock the barb-shaped segments 21 in their sleeve-engaging positions. The rod 25 also forces the hollow cylinder 17 radially outwardly against the heater sleeve 11 to provide an interference seal between the two elements. At the same time, the soft nickel band 23 is compressed between the heater sleeve 11 and the hollow cylinder 17 to provide a further seal. The band 23 is disposed at the point where cylinder 17 passes through the pressure vessel 1, whereby the rigidity of the pressure vessel wall provides additional stiffness and support during the distortion of the band 23.

However, this arrangement, while being an improvement over the arrangements disclosed in the aforementioned patents, still suffers from the shortcoming that sealing is established only by the soft nickel alloy band which is compressed between the cylinder 17 and the heater sleeve and the interference fit which is established between the rod 25 and the cylinder 17.

Accordingly, with the passing of time, the seal, which is provided between the hollow cylinder 17 and the inner periphery of the heater sleeve 11, deteriorates and leakage is apt to re-occur.

SUMMARY OF THE INVENTION

It is an object of the present invention to provide a mechanical plug for vessel penetrations which does not require welding at the pressure boundary parts and which features a prolonged sealing effect which endures the various ravages which occur during the operation of pressure vessel.

It is a further object of the present invention to provide a mechanical plug for vessel penetrations which includes a member which can be inserted into a sleeve or the like type of structure, which automatically secures itself in place and which automatically compresses graphite based seals in a manner which produces a hermetic seal.

In brief, the above objects are achieved by an arrangement wherein a stepped diameter hollow cylinder is provided with grafoil seals which are set on an annular shoulder defined by the stepped diameters of the cylinder. These cylinders are compressed against a lower annular edge of a sleeve which is partially machined away. The hollow cylinder is locked in position in the sleeve by a plurality of barb-shaped flanges which are formed at the upper ends of a plurality of flexible finger-like segments defined in the upper end of the hollow cylinder, and which engage the upper end of the sleeve. A rod, which is disposed in the hollow cylinder, is welded to the cylinder to complete the plugging.

More specifically, a first aspect of the invention features a vessel penetration having a sleeve fixedly disposed through a vessel wall, and which comprises: a hollow cylinder disposed though the sleeve, the hollow cylinder having a stepped outer diameter which defines an annular shoulder portion, the hollow cylinder being formed with a plurality of barb-shaped flange members, each of which is adapted to pass through the sleeve in a first direction and to engage an upper edge of the sleeve in a manner which prevents displacement of the hollow cylinder in a second direction opposite the first direction; and seal means supported on the annular shoulder, the seal means being compressed between a lower annular edge of the sleeve and the annular shoulder.

This aspect of the invention further features a rod which is disposed through a bore defined in the hollow cylinder. Additionally, the hollow cylinder is formed with a plurality of elongate slots which extend in an axial direction of the hollow cylinder, the elongate slots forming a plurality of elongate finger-like segments, each of the elongate segments having a barbed-shaped flange member formed at a leading edge thereof, and being sufficiently flexible to allow flexure when the hollow cylinder is being passed through the sleeve and the barbed-shaped flange members engage the inner peripheral surface of the sleeve.

A second aspect of the present invention resides in a method of plugging a vessel penetration in which a sleeve is fixedly disposed through a vessel wall, comprising the steps of: cutting away a lower portion of the sleeve to form a lower annular edge; disposing seal means on an annular shoulder defined on a stepped outer diameter hollow cylinder; disposing the hollow cylinder through the sleeve until the seal means is compressed between the annular shoulder on the hollow cylinder and the lower annular edge of the sleeve; and locking the hollow cylinder in position with the seal means compressed between the annular shoulder and the annular lower edge using flanges formed at the upper end of the hollow cylinder.

This second aspect of the invention further features the step of: arranging the flanges on elongate flexible segments which are formed in the hollow cylinder, so that the segments can flex and allow the flanges to be displaced radially inwardly when they pass through the sleeve.

BRIEF DESCRIPTION OF THE DRAWINGS

The features and advantages of the present invention will become more clearly appreciated from the following description of the preferred embodiment taken in conjunction with the appended drawings in which:

FIG. 6 is a side sectional view showing a plug according to the present invention.

DETAILED DESCRIPTION OF THE PREFERRED EMBODIMENT

Figure 1:
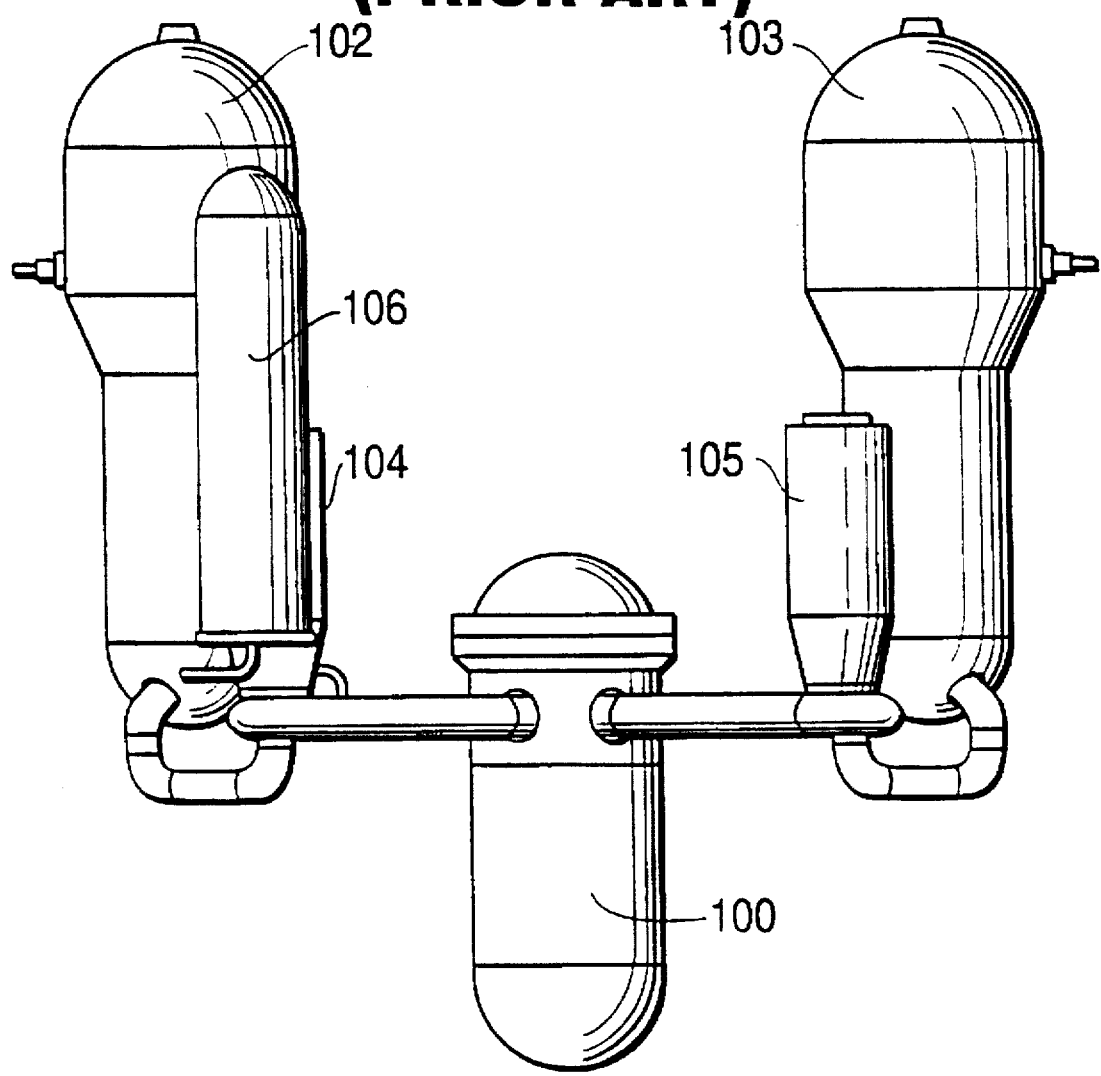
FIG. 1 is a side view showing a pressurized water reactor (PWR) system including a pressurizer to which the present invention is applicable.
Figure 2:
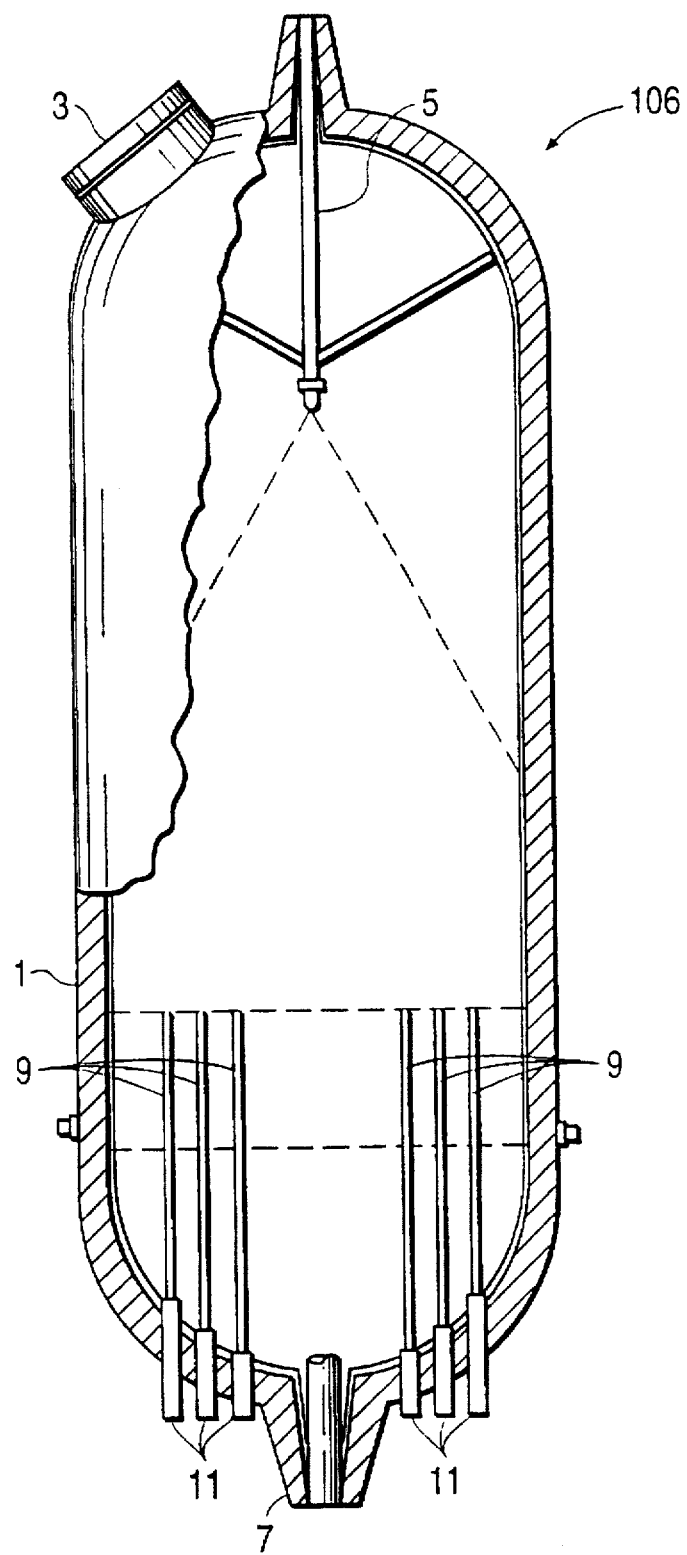
FIG. 2 is a partially sectioned perspective view of a pressurizer of the type to which the present invention is applicable.

FIG. 6 shows an embodiment of the present invention. In this arrangement, a lower portion of the heater sleeve 111 is removed using an EDM cutting technique or the like. A hollow cylinder 117, which is essentially similar to that used in the above-mentioned U.S. Pat. No. 5,297,187 to Sodergren, is disposed in the bore 1a formed in the pressure vessel 1 by the EDM machining so as to extend through the remaining portion of the sleeve 111 in the manner shown. The hollow cylinder 117 however, differs in that it has a stepped external diameter (OD). The larger OD 117A is essentially equal to the bore which is formed by the removal of the lower portion of the heater sleeve 111 while the smaller OD 117B which is essentially equal to the inner diameter of the heater sleeve 111. In this embodiment, the bore which is formed through the center of the hollow cylinder 117 is also stepped so as to have inner diameters (ID) 117D, 117E in a manner suitable for receiving a stepped diameter rod 125.

An annular shoulder 117C is defined on the hollow cylinder 117 by the changes in OD. One or more grafoil seals 200 of predetermined size are disposed on this shoulder and arranged, as shown in FIG. 6 to abut the lower annular edge 111C of the remaining portion of the heater sleeve 111. By cutting the heater sleeve 111 to a predetermined length, it is possible, in light of the dimensions of the hollow cylinder 117, to place the grafoil seals 200 in place and insert the hollow cylinder 117 into the illustrated position in a manner wherein the grafoil seals 200 are suitably compressed and provide a hermetic seal. It is of course within the scope of this invention to add shims 210 to the annular shoulder in order to ensure that the distance between the opposing annular surfaces 117C, 111C is adjusted to the required length and that the grafoil seals 200 are in fact suitably compressed upon insertion of the hollow cylinder 117. As will be readily appreciated, the barb-shaped flanges 121a, which are formed at the leading ends of the flexible segments 121, are such that when allowed to assume the positions illustrated in FIG. 6, hold the hollow cylinder 117 in position, prevent a pressure induced ejection, and ensure that the grafoil seals 200 remain suitably compressed.

An annular band of soft nickel alloy 123 is provided about the larger OD 117A of the hollow cylinder 117. In this embodiment, rather than relying on the forceful insertion of the rod 125, the band 123 is forced outwardly into a sealing engagement with the wall of the bore formed by the EDM machining, using a roller device. The span or area over which this roller device is applied is indicated by the arrow denoted "roll area" in FIG. 6. The rod 125 is inserted into place after the rolling operation and then welded to the lower edge of the hollow cylinder 117 to prevent a pressure responsive ejection and to seal off the interface defined between the rod 125 and the hollow cylinder 117.

Figure 3:
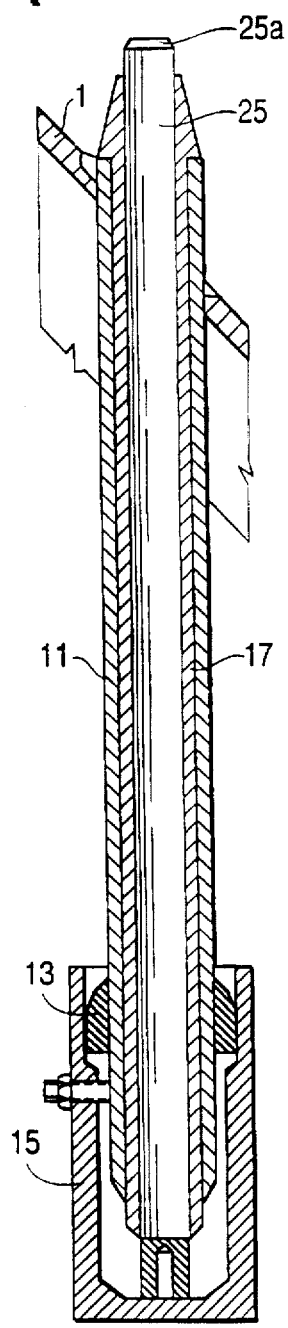
FIG. 3 is a side sectional view of a previously proposed plug.
Figure 4:
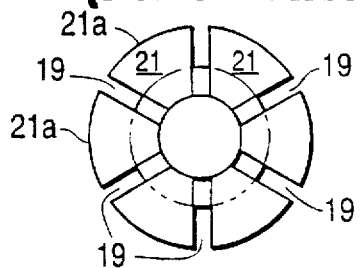
FIG. 4 is a top plan view of a plug arrangement shown in FIG. 3.
Figure 5:
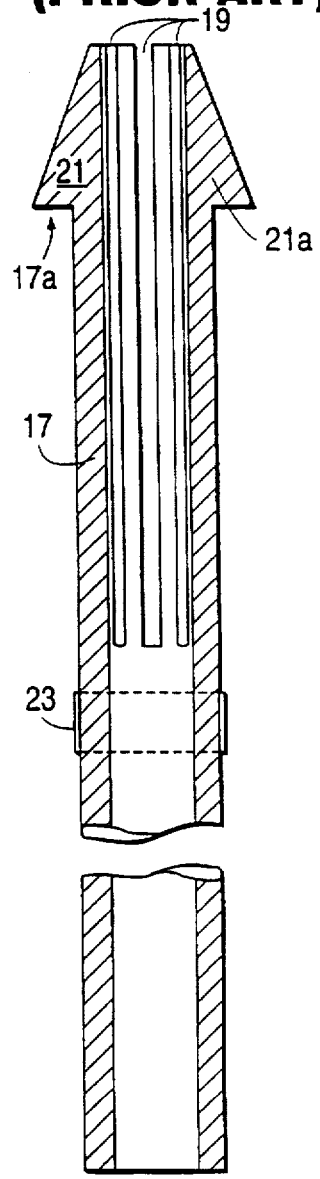
FIG. 5 is a side sectional view showing the elongate slots which provide resilience to the leading end of the plug shown in FIGS. 3 and 4.

It is within the scope of the present invention to add a cap or locking collar 15 of the nature illustrated in FIG. 3, to ensure that the rod 125 does not eject from the sleeve 111. Alternatively, it is possible to add a different type of restraining structure which is either connected to the pressure vessel or some other base which is immovable with respect to the pressure vessel.

Although the present invention has been described with reference to only a single embodiment, it will be understood that a number of variations and changes can be made without departing from the scope of the invention which is limited only by the appended claims.

What is claimed is:

1. A mechanical plug for a vessel penetration having a sleeve fixedly disposed through a vessel wall, comprising:

a hollow cylinder disposed though the sleeve, said hollow cylinder having a stepped outer diameter which defines an annular shoulder portion, said hollow cylinder being formed with a plurality of barb-shaped flange members each of which is adapted to pass through the sleeve in a first direction and to engage an upper edge of the sleeve in a manner which prevents displacement of said hollow cylinder in a second direction opposite the first direction; and seal means supported on said annular shoulder, said seal means being compressed between a lower annular edge of the sleeve and said annular shoulder.

2. A mechanical plug as set forth in claim 1, further comprising a rod which is disposed through a bore defined in said hollow cylinder.

3. A mechanical plug as set forth in claim 2, wherein the bore defined in said hollow cylinder is stepped and said rod has a stepped outer diameter.

4. A mechanical plug as set forth in claim 1, wherein said hollow cylinder is formed with a plurality of elongate slots which extend in an axial direction of said hollow cylinder, said elongate slots forming a plurality of elongate finger-like segments, each of said elongate segments having one of the plurality of barbed-shaped flange member formed at a leading edge thereof, and being sufficiently flexible to allow flexure when the hollow cylinder is being passed through the sleeve and the plurality of barbed-shaped flange members engage an inner peripheral surface of the sleeve.

5. A mechanical plug as set forth in claim 1, wherein the sleeve is partially removed using a cutting device to form a bore and the lower annular edge of the sleeve.

6. A method of plugging a vessel penetration in which a sleeve is fixedly disposed through a vessel wall, comprising the steps of:

cutting away a lower portion of the sleeve to form a lower annular edge;

disposing seal means on an annular shoulder defined on a stepped outer diameter hollow cylinder;

disposing the hollow cylinder through the sleeve until the seal means is compressed between the annular shoulder on the hollow cylinder and the lower annular edge of the sleeve; and locking the hollow cylinder in position with the seal means compressed between the annular shoulder and the annular lower edge using flanges formed at the upper end of the hollow cylinder.

7. A method as set forth in claim 6, further comprising the step of: arranging the flanges on elongate flexible segments which are formed in the hollow cylinder, so that the segments can flex and allow the flanges to be displaced radially inwardly when they pass through the sleeve.

8. A method as set forth in claim 7, further comprising the step of: shaping the flanges so as to have a barbed-like configuration.

9. A mechanical plug as set forth in claim 1, wherein the stepped outer diameter of said hollow cylinder has a first large diameter portion and a second smaller diameter portion, the barbed-shaped flange flanges being formed on the second smaller diameter portion, and which further comprises malleable seal means disposed about a portion of the first large diameter portion said hollow cylinder, said malleable seal means comprising a band of soft malleable metallic material which is forced outwardly into permanent engagement with a portion of the bore which is not covered by the sleeve.

10. A mechanical plug for a vessel penetration having a sleeve fixedly disposed in a portion of a bore which extends through a vessel wall, comprising:

a hollow cylinder disposed though the sleeve, said hollow cylinder having a stepped outer diameter which defines an annular shoulder portion, said hollow cylinder being formed with a plurality of barb-shaped flange members each of which is adapted to pass through the sleeve in a first direction and to engage an upper edge of the sleeve in a manner which prevents displacement of said hollow cylinder in a second direction opposite the first direction;

first seal means supported on said annular shoulder, said seal means being compressed between a lower annular edge of the sleeve and said annular shoulder and maintained compressed by the engagement between the barb-shaped flanges and the upper end of the sleeve; and second seal means disposed about a portion of the first large diameter portion said hollow cylinder, said second seal means comprising a band of soft metallic material which is forced outwardly into permanent engagement with a portion of the bore which is not covered by the sleeve.

11. A method of plugging a vessel penetration in which a sleeve is fixedly disposed through a bore in a vessel wall, comprising the steps of:

cutting away a lower portion of the sleeve to expose a portion of the bore and form a lower annular edge;

disposing seal means on an annular shoulder defined on a stepped outer diameter hollow cylinder;

disposing a band of soft metallic material about a portion of the hollow cylinder;

disposing the hollow cylinder through the sleeve until the seal means is compressed between the annular shoulder on the hollow cylinder and the lower annular edge of the sleeve;

locking the hollow cylinder in position with the seal means compressed between the annular shoulder and the annular lower edge using flanges formed at the upper end of the hollow cylinder; and forcing the portion of the hollow cylinder, about which the band of soft metallic material is disposed, radially outwardly in a manner wherein the band of soft metallic material is forced into permanent sealing engagement with a wall portion of the bore which is exposed by the cutting away of the lower portion of the sleeve.

\* \* \* \* \*